Nov. 2, 1926.  1,604,993

A. GRILLI

TIRE AND LUGGAGE CARRIER

Filed Feb. 2, 1925

INVENTOR.
Angelo Grilli
BY
Erwin, Wheeler & Woolard
ATTORNEYS.

Patented Nov. 2, 1926.

1,604,993

UNITED STATES PATENT OFFICE.

ANGELO GRILLI, OF MILWAUKEE, WISCONSIN, ASSIGNOR OF ONE-HALF TO DAN LIVIERI, OF MILWAUKEE, WISCONSIN.

TIRE AND LUGGAGE CARRIER.

Application filed February 2, 1925. Serial No. 6,278.

This invention relates to improvements in tire and luggage carriers and particularly such tire and luggage carriers as are ordinarily used at the rear of motor vehicles.

It is the object of this invention to provide an improved container for the storage of tires and luggage in which the tires are fully enclosed and protected in an annular compartment while a central compartment is used for the storage of luggage and either compartment is rendered independently accessible.

It is a further object of this invention to provide improved means for engaging spare tires in such a manner as to carry them resiliently, without noise or rattling and without requiring complicated securing devices. Such a mounting for spare tires is particularly serviceable in connection with mechanism of the sort hereinafter to be described in which the tires are fully enclosed in a housing which may be locked to secure the tires against theft and the possibility of loss from the supporting devices.

The use of bumpers has become so prevalent that it has not been thought practicable to use at the rear of motor vehicles tire carriers which completely enclose or house the casings and are provided with doors affording access to the interior of the carrier. The bumpers render the use of the ordinary doors difficult if not impossible and it is one of the objects of this invention to provide a novel and improved construction in which the doors for luggage and tire compartments are so organized that a bumper placed at the rear of the tire and luggage carrier will not interfere with the opening of any of the compartments or the withdrawal of tires or luggage therefrom.

Further objects of this invention are to provide a novel and improved mounting for vehicle tail lights, license plates, stop lights and the like whereby the rear connections to such lights are enclosed and protected from the weather and are nevertheless instantly accessible, to provide a convenient disposition for the filling nipples for the tires without interfering with the introduction or removal of luggage from the carrier, and generally to provide a novel and simplified device for accomplishing the objects above specified and other objects which will be apparent from the following description of the particular functions of the several parts of the device.

In the drawings.

Like parts are identified by the same reference characters throughout the several views.

Figure 1:
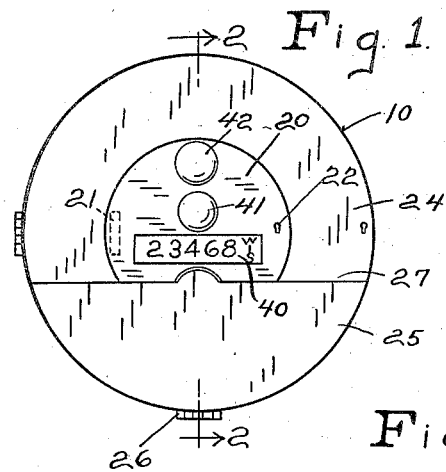
Figure 1 is a rear elevation of a device embodying this invention.
Figure 3:
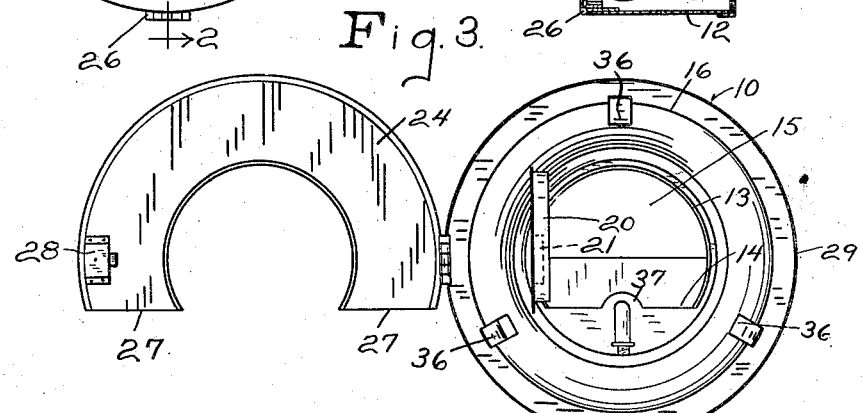
Figure 3 is a view similar to Figure 1 showing the doors of the several compartments open.
Figure 4:
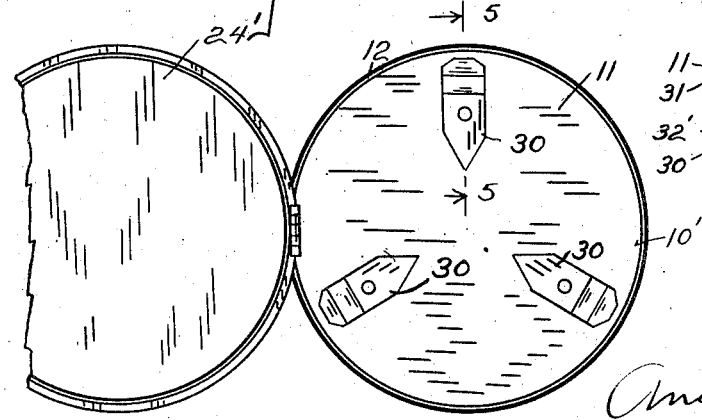
Figure 4 is a view of a modified device embodying certain features of this invention.
Figure 5:
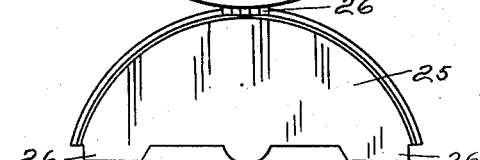
Figure 5 is a fragmental detail taken on line 5—5 of Figure 4.

In its preferred form the improved tire and luggage carrier herein described takes the form of a drum designated in its entirety by reference character 10 and preferably constructed sufficiently large to receive one or more tires bodily. In referring to tires herein it will be understood that I am not using a technical term but am using the word in the popular sense of designating a casing and inflated inner tube operatively mounted on a demountable rim carried for emergency use. In the device shown in Figures 1 to 3 inclusive two such spare tires may be accommodated whereas the device shown in Figures 4 and 5 is adapted to accommodate but one such spare tire.

The drum 10 has a forward wall 11 in the form of a disk and a peripheral wall 12 in rigid connection therewith. A central compartment within the drum is defined by an arcuate wall 13 and a substantially horizontal floor 14 connecting the ends of the arcuate wall 13. The central compartment defined by walls 13 and 14 will hereinafter be designated by reference character 15 while the annular compartment extending about the inside periphery of the drum will be designated by reference character 16. Obviously the compartment 15 is adapted for the storage of tools or luggage while outer compartment 16 is adapted for the storage of spare tires.

Access to compartments 15 and 16 is had from the rear of the device. Compartment 15 is closed by means of a door 20 which corresponds in shape to a cross section of the compartment. This door is hinged at 21 to a portion of wall 13 and is provided at 22 with a lock for securing its contents against unauthorized access. Compartment 16 is closed by means of two doors 24 and 25. Door 25 is segmental in shape and is hinged at 26 to the bottom of the drum. Door 24 corresponds in shape to the segmental portion of an annulus and affords access to all portions of compartment 16 at the sides of the above compartment 15. I have found that by constructing the doors in this manner it is possible to mount the device at the rear of a vehicle in such a way that door 24 will clear the top of the bumper with which the vehicle is provided and door 25 will have so little radial extent that it may be opened within the space between the drum and the bumper. It is not necessary in order to remove or insert spare tires into the device that the door 25 should be swung wide open. It is enough if it swings open to an inclined position in contact with the top of the bumper and by dividing the doors as shown neither door is inconvenient to manipulate. It is particularly to be noted that door 25 is provided with portions 26 which extend upwardly and beneath the ends 27 of door 24 to be confined thereby. Door 24 carries a lock 28 which operates in conjunction with the keeper 29 of the drum to maintain both doors 24 and 25 closed.

Figure 2:
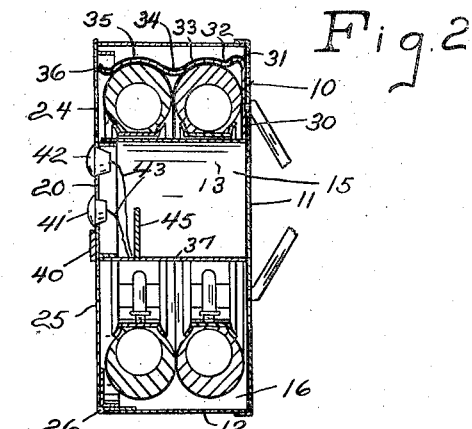
Figure 2 is a sectional view taken on line 2—2 of Figure 1.

The compartment 16 to which access is had by means of doors 24 and 25 is provided interiorly with a number of spring clips which engage the exterior peripheries of spare tires inserted within the drum. These clips are clearly shown in Figures 2 and 5. The clips shown in Figure 2 are adapted to hold a plurality of tires whereas that shown in Figure 5 is adapted to receive and hold but a single spare tire. Each such clip is preferably made integrally of resilient material and includes an arm 30 secured to the rear wall 11 of the drum. The strip of metal of which such arm is composed is bent back upon itself at 31 but is not sharply bent at this point since the purpose of this bend is to provide for the resilient movement of the tire engaging portions of the clip. At 32 the clip is bent rather sharply at an acute angle and thence passes in a broad curve 33 across the peripheral casing portions of one of the spare tires. Between the tires the material is upwardly curved again as at 34 and passes in another broad curve 35 over the outermost spare tire. The extremity of the clip is preferably bent upwardly as shown at 36 to facilitate the introduction of tires.

It is particularly to be noted that no clamps or other securing devices are necessary to mount the tires. The single lock with which door 24 is provided is sufficient to secure both tires against accidental loss or theft. It thereby becomes possible to use an impositive mounting such as that herein described in which the tires are retained merely by the resilient action of the clip. The clip is sprung when the tire is inserted and its resilient strength is such that when the tire reaches one of the upwardly bowed portions 33 or 35 of the clip the clip will tend to resume its original unsprung position thereby to retain the tire. In such a position of the tire there are no metal parts in contact and therefore noise due to the rattling does not exist. The clips or mounting device for the spare tires may be provided in any desired number but I have found that three is a sufficient number if the clips are strong enough. Due to the entire absence of bolts or clamps the positioning or the removal of the spare tires may be accomplished with great facility.

The nipples of the spare tires are accommodated in the space beneath the horizontal floor 14 of compartment 15. In order to increase the capacity of the compartment this floor may conveniently be set at such a level as to require a slightly upwardly bowed portion at 37.

One important feature of the invention consists in the location of the license plate at 40 on the outside of door 20 with the tail light 41 immediately thereabove and the stop light 42 also on said door. It will be noted from Figure 2 that the lamp casings are disposed interiorly of compartment 15 and are thereby protected from dust and from the weather and the cords are also protected from accident. The flexible wiring cords 43 leading to these two lamps permit door 20 to be opened readily while maintaining electrical connection to the lights. When the door is opened the connections to the lights which are ordinarily of the bayonet and socket types may readily be inspected or repaired the rear portions of the lamp casings being fully exposed.

To prevent articles in compartment 15 from becoming tangled in cords 43 a transverse partition 45 may be employed if desired.

In the modified construction shown in Figures 4 and 5 no luggage compartment is used. As a result it becomes unnecessary to have the small central door 20 and the door 24' may be made solid without the central opening. If the carrier is to be used on a vehicle not equipped with bumpers the door may be of circular outline as indicated in Figure 4 thereby dispensing with door 25.

The brackets or mounting devices for the spare tire to be contained in the carrier 10' are similar to those already described and each includes an arm 30 riveted to the rear wall 11 of the drum and comprising a strip of metal bent back upon itself at 31 and bent upwardly at 32'. The curve at this point is made similar to the curve at 31 and is illustrative of the fact that an acute angle is not necessary at 32 in Figure 2. From the bend 32' the bracket extends upwardly in a curved portion 35 corresponding in general to the transverse contour of the casing and terminates in an upwardly extending prong 36 which acts like a cam surface to force the spring bracket yieldingly aside when the spare tire is inserted in the case.

I claim:

1. In a device of the character described, the combination with a drum provided interiorly with an arcuately extending wall dividing the drum into inner and outer compartments, said wall being of less radius than a rim receivable in the outer of said compartments, of a plurality of tire engaging fittings disposed in said outer compartment one of said fittings comprising a resiliently yieldable element arcuately curved for engagement with both sides of the outer periphery of a spare tire and all of said fittings being adapted for engagement with said outer periphery whereby to support a tire out of contact with said drum and said wall through contact with the rubber casing thereof.

2. In a device of the character described, the combination with a drum having an arcuate wall dividing its interior into inner and outer compartments, said wall being of less radius than the rim of a spare time receivable in the outer of said compartments, of a plurality of resilient tire engaging fittings disposed in said outer compartment and positioned for engagement with the outer periphery of a casing of a spare tire in said compartment, said fittings each comprising integrally an arm connected with said drum and a second arm having a resilient portion bent whereby to afford additional freedom of yielding movement, and thence extending in a curve adapted to engage both sides of the peripheral portion of such a casing, whereby resiliently to support the tire in the outer of said compartments out of contact with said drum and said wall.

3. In a device of the character described, the combination with a drum adapted bodily to receive a spare tire, of means adapted resiliently to support said tire wholly out of contact with said drum and including a plurality of peripherally spaced fittings within said drum positioned for engagement with the outer periphery of such a tire, each such fitting comprising integrally an arm connected with the drum and a second arm projecting therefrom and provided with a broadly curved portion engageable with the periphery of the casing of a tire and with a bend intermediate said first and second arms whereby to add to the freedom of resilient movement of the second mentioned arm.

ANGELO GRILLI.